United States Patent Office
3,104,253
Patented Sept. 17, 1963

3,104,253
PHOSPHORUS BORON COMPOUNDS
Theodor Reetz, Webster Groves, Mo., assignor to Monsanto Chemical Company, St. Louis, Mo., a corporation of Delaware
No Drawing. Continuation of application Ser. No. 807,327, Apr. 20, 1959. This application Sept. 18, 1961, Ser. No. 138,587
23 Claims. (Cl. 260—461)

This invention relates to a new type of phosphorus boron compounds and to the method of making the same. In particular, it is concerned with new compounds which may be designated as hydrocarbon substituted phosphite borines, hydrocarbon substituted phosphonite borines, and hydrocarbon substituted phosphinite borines.

Although hydrocarbon substituted phosphorus borines free of oxygen are known (see U.S. 2,860,167), the particular new compounds of this invention have not, prior to applicant's discovery, been previously described. The new compounds of this invention are characterized as being relatively stable in comparison with some other known boron hydrogen compounds. For example, boron compounds like diborane, trimethylamine borine, and sodium borohydride react with dilute acids such as hydrochloric and sulfuric acids to form boric acid and hydrogen. However, most of the new phosphorus boron compounds of this invention do not react with dilute acids, but also are resistant towards iodine. It is known that phosphites, phosphonites, and phosphinites react rapidly with iodine to form the pentavalent phosphorus ester as follows:

$$P(OR)_3 + I_2 + H_2O \rightarrow OP(OR)_3 + 2HI$$

wherein R is a hydrocarbon radical. The above reaction when carried out in the presence of ethanol and sodium bicarbonate has been utilized in the present invention for the purpose of verifying the formation and purity of the new compounds of this invention. In most cases the reaction products consumed either no iodine or only small amounts indicating either the absence of any of the starting trivalent phosphorus compounds or at most about 5 percent of the original trivalent phosphorus compounds, respectively.

It is therefore, an object of this invention to provide new oxygen containing phosphorus boron compounds. A further object is to provide phosphorus boron compounds containing oxygen which exhibit a surprising degree of stability. A still further object is to provide a method for the preparation of these new oxygen containing phosphorus boron compounds. These and other objects of this invention will be apparent from the description that follows.

The new compounds of this invention have the following structural formula:

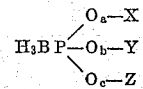

where $a$, $b$, and $c$ each have a value from 0 to 1 and the sum of $a+b+c$ is at least 1. X, Y and Z are each hydrocarbon radicals. The term "hydrocarbon radical" as used in this patent application is to be construed in its broader sense in that the term not only includes aliphatic, aryl, aralkyl, and cycloalkyl radicals but also those hydrocarbons which contain non-reactive substituents such as the halogens like chlorine and fluorine. These substituents are considered non-reactive if they do not interfere with the formation of the new compounds of this invention under the reaction conditions employed. In accordance with this invention these new compounds are prepared by reacting a compound of the structure:

(1) 

where $a$, $b$, and $c$ and the substituents X, Y and Z have the same meaning as above with a compound of the class which is capable of releasing borine or diborane. Compounds of this class include the trialkylamine borines such as trimethylamine borine, triethylamine borine, and the like; boron hydrides; and the metallic borohydrides such as the alkali metal borohydrides, of which the borohydrides of sodium, lithium, and potassium are the preferred. Other metal borohydrides which may be used include those of aluminum and the alkali earth metals. The temperature at which compound (1) above is reacted with the borine releasing compound will depend upon the nature of the latter compound. With the trialkylamine borines, temperatures from 20° C. to 120° C. and even to 150° C. are more suitable. In the case of diborane lower temperatures from 0° C. to —60° C. are more desirable. In the preferred embodiment where metallic borohydrides are employed, temperatures from —40° C. to 100° C. may be used and usually the reaction is carried out in the presence of an ether as a solvent such as ethyl ether, tetrahydrofuran, dioxane, bis(β-methoxyethyl) ether, and the like. Other suitable solvents include dimethylformamide, diethyl acetamide, and the like. Additional inert solvents may be used providing the particular metal borohydride employed is somewhat soluble therein.

It is to be noted that where the compound capable of releasing borine ($BH_3$) is either a borane such as diborane (I) or an amine borine such as trimethylamine borine (II), the reaction takes place readily. A trialkyl phosphite is used by way of illustration although a phosphonite or phosphinite might have been used:

(I) $B_2H_6 + P(OR)_3 \rightarrow 2H_3BP(OR)_3$
(II) $(CH_3)_3NBH_3 + P(OR)_3 \rightarrow H_3CBP(OR)_3 + (CH_3)_3N\uparrow$ where R is an alkyl group.

On the other hand where the compound capable of releasing borine is an alkali borohydride, the latter will not react with the phosphite, phosphonite, or phosphinite unless an additional reagent is used which may be (a) a carbonyl containing compound, (b) a proton donating or releasing compound, or (c) a Lewis acid. Suitable carbonyl containing compounds which can be used include carbon dioxide (III) or a ketone such as dimethyl ketone (IV), as evidenced by the following equations in which a trialkyl phosphite is again used by way of illustration although a phosphonite or phosphinite might have been used:

(III) $NaBH_4 + P(OR)_3 + CO_2 \rightarrow$
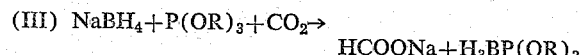
$HCOONa + H_3BP(OR)_3$ (IV)
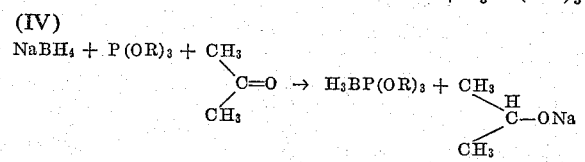

where in each equation R is an alkyl group.

The formation of the new phosphorus borine compounds of this invention as shown by Equations III and IV above with only the partial reduction of the carbonyl compound is unexpected and surprising since metal borohydrides generally tend to react readily with carbonyl compounds and carbon dioxide. It is obvious that other ketones such as diethyl ketone, dihexyl ketone, and the like may have been used in the process of Equation IV above.

It has been also noted in those cases where the compound capable of releasing borine is a metallic borohydride that proton donating or releasing compounds may be used in place of the carbonyl containing compound to effect the reaction of the borohydride with the phosphite, phosphonite, or phosphinite compound. Example of proton donating compounds which may be effectively used are alcohols (V), phenols (VI), inorganic acids such as hydrobromic and hydrochloric (VII), and organic acids such as formic, acetic (VIII), butyric, valeric, and the like. Illustrative of this reaction are the following reactions in which a trialkyl phosphite is again used by way of illustration although a phosphonite or phosphinite might have been used:

Alcohol
(V) $NaBH_4 + P(OR)_3 + C_2H_5OH \rightarrow$
$NaOC_2H_5 + H_3BP(OR)_3 + H_2$ Phenol
(VI) $NaBH_4 + P(O_4)_3 + C_6H_5OH \rightarrow$
$C_6H_5ONa + H_3BP(OR)_3 + H_2$ Inorganic acid
(VII) $NaBH_4 + P(OR)_3 + HCl \rightarrow$
$NaCl + H_3BP(OR)_3 + H_2$ Organic acid
(VIII) $NaBH_4 + P(OR)_3 + CH_3COOH \rightarrow$
$CH_3COONa + H_3BP(OR)_3 + H_2$ where R in each instance is an alkyl radical.

It will be apparent that from Equations V–VIII inclusive that only one mole of the proton donating compound, whether an alcohol, phenol, or acid, is required to effect the reaction. However, a small excess may be used even in the case of inorganic acids (VII), since most of the new phosphorus compounds of this invention are resistant to dilute acids. It will also be evident that other phenols which may be employed in Equation VI above include xylenol, cresol, trimethylphenol, and the like.

Finally it has also been discovered that where the compound capable of releasing borine is a metallic borohydride, a further group of reagents, namely, Lewis acids, in addition to the (a) carbonyl type compounds and (b) the proton donating compounds noted above, can be used to effect the reaction of the metallic borohydride with the phosphite, phosphonite, or phosphinite compound. By way of example the following reaction (IX) is given in which a trialkyl phosphite is again used to illustrate although a phosphonite or phosphinite might have been taken as an example of this reaction:

Lewis acid
(IX) $3NaBH_4 + 4P(OR)_3 + 4BF_3 \rightarrow$
$3NaBF_4 + 4H_3BP(OR)_3$ where R is an alkyl radical.

Representative of other Lewis acids besides $BF_3$ which may be effectively employed in this reaction are $BCl_3$, $AlCl_3$, $FeCl_3$, $SnCl_4$, $ZnCl_2$, and the like.

From the above it will be apparent that the method of preparing the new compounds of this invention is of a general nature. The examples which follow are given to provide an indication of suitable reactants, solvents, and proportions of same as well as temperatures to be used in preparing the new oxygen containing phosphorus boron compounds of this invention.

EXAMPLE I

*Trimethylphosphite Borine*

$H_3BP(OCH_3)_3$

A mixture of 20.8 g. of sodium borohydride ($NaBH_4$), 62.0 g. of trimethylphosphite, and 130 ml. of tetrahydrofuran was treated with $CO_2$ at 25–28° C. with stirring over a period of 8 hours. The reaction mixture was filtered and the filtrate washed with dilute HCl to remove the tetrahydrofuran and any excess of $P(OCH_3)_3$. The product was then washed with water and dried with $Na_2SO_4$. There was obtained 57.5 g. (82.5 percent of theory) trimethyl phosphite borine, B.P. 86° C. at 23 mm. Hg.

EXAMPLE II

*Triisopropylphosphite Borine*

$H_3BP(OC_3H_7)_3$

A. A mixture of 1.3 g. of trimethylamineborine and 4.3 g. of triisopropylphosphite was heated in a reaction vessel which was connected with a $CO_2$ cooled trap. Although some evolution of trimethylamine was observed at room temperature, pronounced evolution of trimethylamine began at about 50–60° C. The mixture was gradually heated to 120° C. and finally to 140° C. for a short time. The product was distilled and there was obtained 3.5 g. (88 percent of theory) of triisopropylphosphite borine which boiled at 42–42.5° C. at 0.1 mm Hg.

B. When the above procedure was repeated with dimethylamine borine instead of trimethylamine borine, there was obtained a reduced yield (57 percent of theory), (which was probably attributable to side reactions).

EXAMPLE III

*Triethylphosphite Borine*

$H_3BP(OC_2H_5)_3$

A mixture of 11.34 g. of sodium borohydride ($NaBH_4$), 50.0 g. of triethylphosphite, and 120 ml. of tetrahydrofuran was treated with $CO_2$ at 25–30° C. with vigorous stirring. The exothermic reaction which took place resulted in the absorption of the $CO_2$ and was complete in about 3 hours. The reaction mixture was then stirred at room temperature in the presence of $CO_2$ for 5 additional hours. The reaction mixture was filtered and the filtrate evaporated under vacuum conditions at 15 mm. Hg. There was obtained upon redistillation 39.7 g. (73 percent of theory) of pure triethylphosphite borine, B.P. 106° C. at 22 mm. Hg.

EXAMPLE IV

*Tris(β-Chloroethyl) Phosphite Borine*

$H_3BP(OCH_2CH_2Cl)_3$

A mixture of 7.56 g. of sodium borohydride ($NaBH_4$), 53.9 g. of tris(β-chloroethyl) phosphite, and 100 ml. of tetrahydrofuran was treated with $CO_2$ at 25–28° C. with vigorous stirring for 8 hours. The resulting reaction mixture was filtered and the filtrate evaporated. The residue was washed several times with dilute HCl and twice with dilute aqueous solution of $Na_2SO_4$. The resulting oil, which was separated and dried with $Na_2SO_4$, amounting to 46.5 g. (82 percent of theory) was essentially pure tris(β-chloroethyl) phosphite borine.

EXAMPLE V

*Triphenylphosphite Borine*

$H_3BP(OC_6H_5)_3$

A mixture of 8.0 g. of sodium borohydride ($NaBH_4$), 62.0 g. of triphenyl phosphite, and 120 ml. of tetrahydrofuran was treated with $CO_2$ at 28° C. with vigorous stirring for 5 hours. The reaction mixture was then lightly diluted with water from which an oil precipitated. The oil shortly thereafter crystallized. After drying the crystals in vacuum (25 mm. Hg), there was obtained 45.5 g. (70 percent of theory) of crystalline triphenylphosphite borine, M.P. 53–55° C.

EXAMPLE VI

*Dimethylphenylphosphonite Borine*

$$H_3BP(OCH_3)_2$$
$$|$$
$$C_6H_5$$

A mixture of 4.1 g. of sodium borohydride (NaBH$_4$), 17.4 g. of dimethylphenylphosphonite, and 100 ml. of tetrahydrofuran was treated with CO$_2$ at 28–30° C. with vigorous stirring for 5 hours. Then the reaction mixture was filtered and the filtrate evaporated under reduced pressure. The residue was distilled and there was obtained 11.0 g. (60 percent of theory) of dimethylphenylphosphonite borine, B.P. 79.5–80.0° C. at 0.2 mm. Hg.

EXAMPLE VII

*Tri(n-Butyl) Phosphite Borine*

$$H_3BP(O\text{---}n\text{-}C_4H_9)_3$$

A mixture of 3.9 g. of sodium borohydride (NaBH$_4$), 25.0 g. of tri(n-butyl) phosphite, and 60 ml. of tetrahydrofuran was treated with CO$_2$ at 27–28° C. with vigorous stirring for 4 hours. The reaction mixture was then diluted with a large excess of water from which an oil separated. The oil was further washed with dilute HCl and water. The oil was then dried with Na$_2$SO$_4$ and subject to vacuum (0.5 mm. Hg) at 35° C. for 2 hours. There was obtained 22.6 g. (85 percent of theory) of tri(n-butyl) phosphite borine.

EXAMPLE VIII

*Tris(β-Trifluoroethyl) Phosphite Borine*

$$H_3BP(OCH_2CF_3)_3$$

A mixture of 2.0 g. of sodium borohydride (NaBH$_4$), 16.4 g. of tris(β-trifluoroethyl) phosphite, and 60 ml. of tetrahydrofuran was treated with CO$_2$ at 28–30° C. with vigorous stirring for 3½ hours. The reaction mixture was then diluted with a large excess of water from which an oil separated. The oil was further washed with dilute HCl and water. The oil was then dried with Na$_2$SO$_4$ and subject to vacuum (0.5 mm. Hg) at 30° C. to remove low boiler impurities. There was obtained 15.8 g. (92.0 percent of theory) of tris(β-trifluoroethyl) phosphite borine.

EXAMPLE IX

*Tricyclohexylphosphite Borine*

$$H_3BP(OC_6H_{11})_3$$

A mixture of 4.0 g. of sodium borohydride (NaBH$_4$), 32.8 g. of tricyclohexyl phosphite, and 80 ml. of tetrahydrofuran was treated with CO$_2$ at 28–30° C. with vigorous stirring for 3½ hours. The reaction mixture was then diluted with a large excess of water from which an oil separated. The oil was further washed with dilute HCl and water. The oil was then dried with Na$_2$SO$_4$ and subject to vacuum (0.1 mm. Hg) at 30° C. to give 28.5 g. (83 percent of theory) of tricyclohexylphosphite borine, M.P. 69.0° C. This new boron compound unlike tricyclohexyl phosphite is not hydroscopic. (See A. E. Arbusov and F. G. Valitova, C. A. (1953) p. 10462.)

EXAMPLE X

*Tri(Tridecyl) Phosphite Borine*

$$H_3BP(OC_{13}H_{27})_3$$

The procedure of Example VII above was repeated except the reactants were 3.8 g. of sodium borohydride, 67.7 g. of tri(tridecyl) phosphite, and 125 ml. of tetrahydrofuran. There was obtained 65.5 g. (94.0 percent of theory) of tri(tridecyl) phosphite borine.

EXAMPLE XI

*Ethyl Diphenylphosphinite Borine*

$$H_3BPOC_2H_5$$
$$|$$
$$(C_6H_5)_2$$

A mixture of 2.2 g. of sodium borohydride (NaBH$_4$), 12.5 g. of ethyl diphenylphosphinite, and 50 ml. of tetrahydrofuran was treated with CO$_2$ at 25–30° C. with vigorous stirring for 3 hours. The reaction mass was then diluted with a large excess of water from which an oil was separated. The oil was further washed with dilute HCl and water. The oil was then dried with Na$_2$SO$_4$ and subjected to vacuum (0.1 mm. Hg) at 30° C. for 3 hours. There was obtained 11.2 g. (77.0 percent of theory) of ethyl diphenylphosphinite borine.

EXAMPLE XII

*Triethylphosphite Borine*

$$H_3BP(OC_2H_5)_3$$

There was added 30.0 g. BF$_3$ET$_2$O in a dropwise manner to a mixture of 5.7 g. NaBH$_4$ and 80 ml. of tetrahydrofuran at −30° C. with stirring within 70 minutes, followed by heating the reaction mixture under reflux conditions. The B$_2$H$_6$ generated in this way (JACS 75, 1953, pp. 202–7) was introduced into a solution of 50 g. P(OEt)$_3$ in 50 ml. tetrahydrofuran at −20° C. with stirring. The reaction mixture was treated with dilute HCl, from which an oily product separated. This was washed with water and dried with K$_2$CO$_3$. Finally it was subjected to vacuum, 10 mm. Hg at 50° C., until the weight was constant. There was obtained 33.5 g. (92.5% of theory) essentially pure triethylphosphite borine.

EXAMPLE XIII

*Tri(n-heptyl) Phosphite Borine*

$$H_3BP(O\text{---}n\text{-}C_7H_{15})_3$$

The procedure of Example VIII above was repeated except the reactants were 5.5 g. of sodium borohydride, 37.6 g. of tri(n-heptyl) phosphite, and 100.0 ml. of tetrahydrofuran. There was obtained 36.8 g. (95.0 percent of theory) of tri(n-heptyl) phosphite borine.

EXAMPLE XIV

*Triethylphosphite Borine*

$$H_3BP(OC_2H_5)_3$$

A mixture of 5.5 g. of potassium borohydride, 16.6 g. of triethyl phosphite, and 50 ml. of dimethylformamide was treated with CO$_2$ at room temperature with vigorous stirring. The temperature of the reaction mass rose to 35° but was cooled to 30° C. and maintained at that temperature for one hour. The reaction mass was then stirred for 3 hours at room temperature. The resulting mixture was filtered and the filtrate evaporated at room temperature under vacuum conditions of 15 mm. Hg. There was obtained 13.5 g. (75.0 percent of theory) of triethylphosphite borine.

EXAMPLE XV

*Triethylphosphite Borine*

A mixture of 3.8 g. of sodium borohydride (NaBH$_4$), 20.0 g. of triethylphosphite, and 100 ml. of tetrahydrofuran did not react even on heating at reflux. However, when 9.4 g. of phenol was gradually added a moderate formation of H$_2$ took place. It is believed that the following reaction took place:

$$NaBH_4 + HOC_6H_5 + P(OC_2H_5)_3$$
$$\rightarrow NaOC_6H_5 + H_2 + H_3BP(OC_2H_5)_3$$

After 3 hours' refluxing the reaction mixture was treated several times with much water to dissolve the sodium phenolate and tetrahydrofuran. The insoluble portion, the triethyl phosphite borine was separated and washed with a dilute HCl to remove trialkyl phosphite. Finally the product was dried with Na$_2$CO$_3$ and evacuated at 30° for 3 hours. There was obtained 13.6 g. (75% of theory) of essentially pure triethyl phosphite borine.

EXAMPLE XVI

*Triethylphosphite Borine*

A mixture of 20 g. of triethyl phosphite, 3.8 g. of sodium borohydride (NaBH₄), 10 g. of trifluoroethanol (F₃CH₂OH) and 100 g. of tetrahydrofuran was heated at reflux with stirring for 18 hours. A slow evolution of hydrogen took place which stopped after a few hours. The reaction mixture was then treated with much dilute HCl. The product was separated from the water layer, dried with Na₂CO₃ and subject to vacuum (10 mm. Hg at 25°). There was obtained 4.3 g. (24% of theory) of triethylphosphite borine.

EXAMPLE XVII

*Triethylphosphite Borine*

A solution of 60 g. of glacial acetic acid in 20 ml. of tetrahydrofuran was added over a period of one hour to a mixture of 20 g. of triethyl phosphite, 3.89 g. of sodium borohydride (NaBH₄), and 100 ml. of tetrahydrofuran with stirring at 8–10° C. Strong evolution of H₂ was observed as the acid was added. When an additional gram of acid was added, only a small amount of H₂ was noted indicating that the reaction was essentially completed. The reaction mixture was then heated at 50° C. for 45 minutes. Thereafter it was treated with dilute HCl followed by washing with water. The product was then dried with Na₂CO₃ and evacuated at 25° C. (10 mm. Hg). There was obtained 15.2 g. (88.5% of theory) of triethylphosphite borine.

EXAMPLE XVIII

*Triethylphosphite Borine*

A solution of 10.2 g. of isovaleric acid in 30 ml. of tetrahydrofuran was added to a mixture of 3.8 g. of sodium borohydride (NaBH₄), 20 g. of triethyl phosphite, and 130 ml. of tetrahydrofuran at 10° C. with stirring over a period of 1½ hours. A strong evolution of H₂ was noted. The reaction mixture was then heated at reflux for 15 minutes and then several times treated with dilute NaOH to remove the unreacted valeric acid followed by treatment with dilute HCl to remove the excess of triethyl phosphite. Finally the product was washed with water, separated, dried with Na₂SO₄, and evacuated at 25° C. (10 mm. Hg). There was obtained 13.6 g. (75.5% of theory) of triethylphosphite borine.

EXAMPLE XIX

*Triisopropylphosphite Borine*

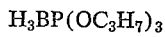

A solution of 3.9 g. HCl dissolved in 30 ml. of tetrahydrofuran was added to a mixture of 3.8 g. of sodium borohydride, 30 g. of triisopropyl phosphite, and 80 ml. of tetrahydrofuran at −20° to −25° C. with stirring over a period of 90 minutes. The reaction mixture was heated at 25° C. for one hour. Then 10 g. of methanol was slowly added followed by the addition of 350 ml. of water with stirring to dissolve the excess of triisopropyl phosphite in the tetrahydrofuran. The organic layer was then washed with water, dried with Na₂CO₃, and subjected to vacuum at 45° C. (10 mg. Hg) until the weight was constant. There was obtained 15.0 g. (72 percent yield) of triisopropylphosphite borine.

EXAMPLE XX

*Triisopropylphosphite Borine*

There was gradually added 6.2 g. boric acid to a stirred mixture of 30 g. triisopropyl phosphite, 3.8 g. NaBH₄, and 80 ml. tetrahydrofuran at 18° within one hour. A strong evolution of H₂ was observed. Then 10 ml. of H₂O was slowly added. When the H₂ evolution stopped, the reaction mixture was diluted with 350 ml. dilute HCl (about 0.2 n). The organic layer was washed with water, dried with Na₂CO₃ and subjected to vacuum (10 mm. Hg) at 45° C. There was obtained 7.3 g. (32.5% of theory) of triisopropylphosphite borine.

EXAMPLE XXI

*Triisopropylphosphite Borine*

To a mixture of 3.8 sodium borohydride and 80 ml. of tetrahydrofuran at −40° C. there was added 6.2 g. of glacial acetic acid over a period of one hour. This mixture was heated slowly to 55° C. and maintained at this temperature for 10 minutes. Then 30 g. of triisopropyl phosphite was added and the resulting reaction mixture was stirred at 50° C. for 2 hours. The organic layer was washed with water, dried with Na₂CO₃, and subjected to vacuum treatment, as in the previous examples. There was obtained 17.9 g. (81% of theory) of triisopropyl borine.

EXAMPLE XXII

*Triisopropylphosphite Borine*

A solution of 18.92 g. boronfluoride etherate—BF₃(C₂H₅)₂O—dissolved in 20 ml. of tetrahydrofuran was gradually added to a mixture of 3.8 g. of sodium borohydride, 80 ml. of tetrahydrofuran, and 30 g. of triisopropyl phosphite at −30° C. with stirring over a period of one hour. The reaction mixture was heated to 50° C. and maintained at this temperature for 3 hours. Then 10 ml. water was slowly added. The reaction mixture was worked up in the manner set forth in Example XXI. There was obtained 23.7 g. (87.2% of theory) of triisopropylphosphite borine.

EXAMPLE XXIII

*Triisopropylphosphite Borine*

A mixture of 17.4 g. acetone with 15 g. of water was gradually added to a stirred mixture of 3.8 g. NaBH₄, 30 g. P(O—CSOC₃H₇)₃ and 80 ml. tetrahydrofuran at 18° over a period of 1½ hours. The mixture was stirred at 50° C. for one hour and then worked up as in Example XXI above. There was obtained 16.0 g. (92% of theory) of triisopropylphosphite borine.

Illustrative and representative of additional compounds which may be prepared in accordance with the process of this invention include:

Ethyl diethylphosphinite,
Propyl diethylphosphinite,
Isopropyl diethylphosphinite,
Butyl diethylphosphinite,
Isobutyl diethylphosphinite,
Hexyl diethylphosphinite,
Heptyl diethylphosphinite,
Octyl diethylphosphinite,
Nonyl diethylphosphinite,
Decyl diethylphosphinite,
Hexyl diphenylphosphinite,
Diethyl ethylphosphonite,
Dimethyl ethylphosphonite,
Dimethyl (p-dimethylaminophenyl) phosphonite,
Diallyl phenylphosphonite,
Diallyl p-chlorophenylphosphonite,
Dibutyl butylphosphonite,
Diisobutyl isobutylphosphonite,
Diethyl propyl phosphonite,
Dipropyl propylphosphonite,
Diethyl butylphosphonite,
Dipropyl butylphosphonite, and the like.

The new borines of this invention have considerable utility and are of particular value as a gasoline additive to prevent pre-ignition. By way of example, tricresyl phosphate a well known pre-ignition suppressant, has been found to be only 60 percent as effective as certain of the new compounds of this invention with respect to preventing pre-ignition. In addition the new compounds of this invention find use as anti-oxidants, catalysts, in oil additives, and as blowing agents in epoxy resins representative of which would be the reaction product of bis (4-hydroxyphenyl)-2,2-propane and epichlorohydrin.

While this invention has been described with respect to certain embodiments, it is not so limited, and it is to be understood that variations and modifications thereof obvious to those skilled in the art may be made without departing from the spirit or scope of this invention.

This application is a continuation of my copending application Serial No. 807,327, filed April 20, 1959, now abandoned.

The embodiments of the invention in which an exclusive property or privilege is claimed are defined as follows:

1. A compound of the formula

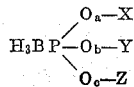

where X, Y and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one.

2. A compound of the formula

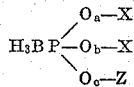

where X, Y and Z are each alkyl, $a$, $b$, and $c$ each has a value from zero to one and the sum of $a+b+c$ is at least one.

3. A compound of the formula

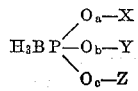

where each of X, Y, and Z is a monocyclic aromatic hydrocarbon, $a$, $b$, and $c$ each has a value from zero to one and the sum of $a+b+c$ is at least one.

4. Trimethylphosphite borine.
5. Triethylphosphite borine.
6. Tris-β-chloroethylphosphite borine.
7. Triisopropylphosphite borine.
8. Triphenylphosphite borine.
9. Tricyclohexylphosphite borine.
10. Ethyl diphenylphosphinite borine.
11. Diethyl ethylphosphonite borine.
12. The process for preparing a compound of the formula

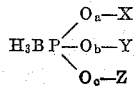

where X, Y and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one, which comprises reacting a compound of the formula

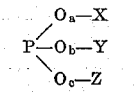

where $a$, $b$, $c$, X, Y, and Z have the same meaning as above with a borine group releasing compound selected from the group consisting of alkylamine borines, boron hydrides and metal borohydrides.

13. The process of preparing a compound of the formula

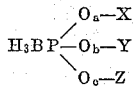

where X, Y and Z are each alkyl, $a$, $b$, and $c$ each has a value from zero to one and the sum of $a+b+c$ is at least one which comprises reacting a compound of the formula

where $a$, $b$, $c$, X, Y, and Z have the same meaning as above with a borine group releasing compound selected from the group consisting of alkylamine borines, boron hydrides and metal borohydrides.

14. The process of preparing a compound of the formula

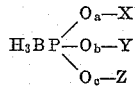

where each of X, Y and Z is a monocyclic aromatic hydrocarbon, $a$, $b$, and $c$ each has a value from zero to one and the sum of $a+b+c$ is at least one, which comprises reacting a compound of the formula

where $a$, $b$, $c$, X, Y, and Z have the same meaning as above with a borine group releasing compound selected from the group consisting of alkylamine borines, boron hydrides and metal borohydrides.

15. The process of preparing a compound of the formula

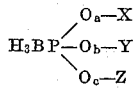

where X, Y and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one, which comprises reacting a compound of the formula

where $a$, $b$, $c$, X, Y, and Z have the same meaning as above with an alkylamine borine.

16. The process of preparing a compound of the formula

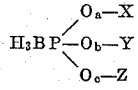

where X, Y and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one, which comprises reacting a compound of the formula

where $a$, $b$, $c$, X, Y, and Z have the same meaning as above with a boron hydride.

17. The process of preparing a compound of the formula

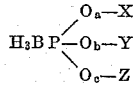

where X, Y, and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one, which comprises reacting a compound of the formula

where $a$, $b$, $c$, X, Y, and Z have the same meaning as above with a metal borohydride and a carbonyl type compound of the class consisting of carbon dioxide and ketones.

18. The process of preparing a compound of the formula

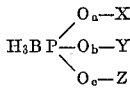

where X, Y, and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one, which comprises reacting a compound of the formula

where $a$, $b$, $c$, X, Y, and Z have the same meaning as above with a metal borohydride and an acid type compound selected from the group consisting of fatty acids having 1 to 5 carbon atoms, mineral and Lewis type acids, and phenols.

19. The process of preparing a compound of the formula

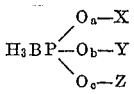

where X, Y, and Z are selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one which comprises reacting a compound of the formula

where $a$, $b$, $c$, X, Y, and Z have the same meaning as above with trimethylamine borine.

20. The process of preparing a compound of the formula

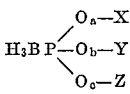

where X, Y, and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one which comprises reacting a compound of the formula

where $a$, $b$, $c$. X, Y, and Z have the same meaning as above with triethylamine borine.

21. The process of preparing a compound of the formula

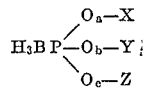

where X, Y, and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one which comprises reacting a compound of the formula

where $a$, $b$, $c$. X, Y, and Z have the same meaning as above with diborane.

22. The process of preparing a compound of the formula

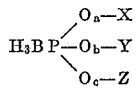

where X, Y, and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one which comprises reacting a compound of the formula

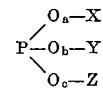

where $a$, $b$, $c$. X, Y, and Z have the same meaning as above with sodium borohydride and carbon dioxide in the presence of a solvent.

23. The process of preparing a compound of the formula

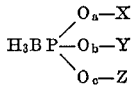

where X, Y, and Z are each selected from the group consisting of alkyl, haloalkyl, cycloalkyl, allyl, monocyclic aromatic hydrocarbons and halogenated monocyclic aromatic hydrocarbons, $a$, $b$, and $c$ each has a value from zero to one and the sum of $a+b+c$ is at least one which comprises reacting a compound of the formula

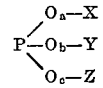

where $a$, $b$, $c$. X, Y, and Z have the same meaning as above with potassium borohydride and carbon dioxide in the presence of a solvent.

References Cited in the file of this patent

UNITED STATES PATENTS

| | | |
|---|---|---|
| 2,844,454 | Birum | July 22, 1958 |
| 2,921,096 | Burg et al. | Jan. 12, 1960 |
| 2,925,440 | Burg et al. | Feb. 16, 1960 |
| 2,926,194 | Burg et al. | Feb. 23, 1960 |

OTHER REFERENCES

Graham et al.: "J. Inorg. Nuclear Chem.," vol. 3, pp. 164–169, 1956.

Reetz, "J. Am. Chem. Soc.," vol. 82, No. 19, Oct. 5, 1960, pp. 5039–5042.